United States Patent [19]

Maloney et al.

[11] Patent Number: 5,684,870

[45] Date of Patent: *Nov. 4, 1997

[54] METHOD AND SYSTEM FOR TRANSFERRING CALLS AND CALL-RELATED DATA BETWEEN A PLURALITY OF CALL CENTERS

[75] Inventors: Michael J. Maloney, Plano, Tex.; Bruce Lewis Hitson, Mountain View; David Thompson McCalmont, San Jose, both of Calif.

[73] Assignee: Teknekron Infoswitch Corporation, Fort Worth, Tex.

[ * ] Notice: The term of this patent shall not extend beyond the expiration date of Pat. No. 5,555,299.

[21] Appl. No.: 707,872

[22] Filed: Sep. 9, 1996

Related U.S. Application Data

[63] Continuation of Ser. No. 502,596, Jul. 14, 1995, Pat. No. 5,555,299, which is a continuation of Ser. No. 329,677, Oct. 26, 1994, abandoned, which is a continuation of Ser. No. 89,111, Jul. 8, 1993, abandoned.

[51] Int. Cl.[6] ................................................. H04M 3/58
[52] U.S. Cl. ........................ 379/212; 379/201; 379/210; 379/211; 379/265; 379/309
[58] Field of Search ............................... 379/93, 96, 201, 379/210, 211, 212, 265, 266, 309

[56] References Cited

U.S. PATENT DOCUMENTS

| | | | |
|---|---|---|---|
| 4,379,946 | 4/1983 | Mizuno et al. | 178/3 |
| 4,706,080 | 11/1987 | Sincoskie | 340/825.02 |
| 4,706,081 | 11/1987 | Hart et al. | 340/825.03 |
| 4,757,267 | 7/1988 | Riskin | 379/113 |
| 4,805,209 | 2/1989 | Baker, Jr. et al. | 379/96 |
| 4,821,034 | 4/1989 | Anderson et al. | 340/825.8 |
| 4,866,758 | 9/1989 | Heinzelmann | 379/94 |
| 4,942,540 | 7/1990 | Black et al. | 364/514 |
| 4,943,996 | 7/1990 | Baker, Jr. et al. | 379/96 |
| 5,007,017 | 4/1991 | Kobayashi | 364/900 |
| 5,008,930 | 4/1991 | Gawrys et al. | 379/210 |
| 5,097,528 | 3/1992 | Gursahaney et al. | 379/67 |
| 5,136,634 | 8/1992 | Rae et al. | 379/100 |
| 5,181,239 | 1/1993 | Jolissaint | 379/96 |
| 5,271,058 | 12/1993 | Andrews et al. | 379/210 |
| 5,291,551 | 3/1994 | Conn et al. | 379/210 |
| 5,335,269 | 8/1994 | Steinlicht | 379/266 |

FOREIGN PATENT DOCUMENTS 0377394  11/1990  European Pat. Off. .......... H04M 3/50

*Primary Examiner*—Krista M. Zele
*Assistant Examiner*—Scott Wolinsky
*Attorney, Agent, or Firm*—Baker & Botts, L.L.P.

[57] ABSTRACT

This invention permits transferring calls along with data that identifies, for example, the caller's name, pertinent account information, any transaction information acquired prior to the need to transfer the call and why the caller is being transferred between a plurality of call centers. The method and system of the invention, therefore, coordinate a voice component and a data component of a call to transfer the call from a first call center across a communication path such as a switching network to a second call center. The first call center includes the necessary network control circuitry to direct an associated switching network to transfer to the second call center the voice component of the call together with an identifier for uniquely identifying the call. The identifier may be generated using DNIS and/or ISDN protocol principles. The method and system also generate and direct a transfer screen from the first call center to the second call center. The unique identifier also attaches to the transfer screen. Using the unique identifier at the second call control center, the invention uses an automatic call distributor or similar routing device to route the voice component to an available customer service representative. The routing device then informs control circuitry of the second call center of the customer service representative's identity. Then the control circuitry sends the transfer screen to a workstation where the customer service representative may service the call with the aid of the transfer screen information.

20 Claims, 4 Drawing Sheets

METHOD AND SYSTEM FOR TRANSFERRING CALLS AND CALL-RELATED DATA BETWEEN A PLURALITY OF CALL CENTERS

CROSS REFERENCE TO RELATED APPLICATIONS

This application is a continuation application of U.S. application Ser. No. 08/502,596, filed Jul. 14, 1995 and entitled "Method and System for Transferring Calls and Call-Related Data Between a Plurality of Call Centers," by Michael J. Maloney, Bruce L. Hitson and David T. McCalmont, now U.S. Pat. No. 5,555,299, issued Sep. 10, 1996; which is a continuation of U.S. application Ser. No. 08/329,677, filed Oct. 26, 1994 and entitled "Method and System for Transferring Calls and Call-Related Data Between a Plurality of Call Centers" by Michael J. Maloney, Bruce L. Hitson and David T. McCalmont, now abandoned; which is a continuation of U.S. application Ser. No. 08/089,111, filed Jul. 8, 1993 by Michael J. Maloney, Bruce L. Hitson and David T. McCalmont, now abandoned.

TECHNICAL FIELD OF THE INVENTION

The present invention relates to telecommunications systems and methods for controlling such systems and, more particularly, to a method and system for transferring calls along with data that identifies the caller's name, pertinent account information, any transaction information acquired prior to the need to transfer the call and why they are being transferred between a plurality of call centers.

BACKGROUND OF THE INVENTION

The global marketplace is becoming more open and more efficient at providing goods and services. Inexpensive global communication and transportation make it possible for consumers and suppliers to develop and maintain relationships without ever meeting face-to-face. In this environment, customer service is a crucial factor that separates the strong businesses from the weak and is a logical focal point for companies that seek to gain market share for both new and existing products.

For a supplier or vendor who offers telephone order placement, service, or a combination of both order placement and service, the customer service representative (CSR) —sometimes referred to more simply as "the agent"—is the interface between the customer on the outside and the business on the inside. The CSR works to keep customers happy, and serves as a crucial link between the customer and the internal operations of the company. Moreover, the CSR is a comparatively expensive portion of the overall customer service picture. It is, therefore, very important that the CSR perform efficiently. Good customer service from a CSR's perspective means being able to access the corporate information that he or she needs to provide maximum service and responsiveness to a customer inquiry.

Another part of good customer service is the ability to receive incoming calls and intelligently route them to the most qualified available agent. In many call center (CC) environments, for example, agents are typically segregated into groups, groups are assigned to handle specific call types arriving on telephone trunks, and trunks are designated for particular purposes such as support and product inquiry.

One problem associated with providing quality customer service through a CSR is that in some customer call centers, important callers are often left on hold for long periods of time waiting for the few highly-skilled agents that can best handle their calls. Additionally, important callers frequently may be connected to agents that are not trained to completely answer questions that the caller poses. The caller is then subjected to further aggravation. That is, when the caller realizes that he is not speaking to the proper CSR, he will request or be involved in a transfer to another department or CSR. As such, he may be further delayed due to being passed to a different agent group having to queue again, as well as having to repeat all pertinent call-related information that he has already explained as he tries to get the information he desires. With these complications, it is clear that call management directly affects both the customer perspective and the CSR perspective on service.

In a call center therefore, it is important that customers receive the greatest quality of service within the shortest amount of time by the most qualified agent available who has at his or her disposal the right information for the particular service call. To achieve this objective, there is often the need to transfer a service call from a first CC to a second CC where a CSR can properly respond to the customer. This necessarily includes the ability to provide the receiving CSR at the second CC all pertinent information about the caller that the first CC has pertaining to the call.

Consequently, there is a need for a method and system that permit a call center manager to effectively service calls pertaining to his or her call center and to transfer calls to other call centers in order to improve customer service and satisfaction.

There is a need for a method and system that provides a first agent with the ability to quickly route calls and related customer data to another agent at a different call center who can address the customer's specific requirements. At the same time, it is necessary that such a method and system prevent the customer from having to spend time repeating information that the customer already provided to the first agent.

SUMMARY OF THE INVENTION

The present invention, therefore, provides a method and system for transferring calls between a plurality of call centers that overcomes or substantially reduces limitations associated with prior methods and systems for effecting such call transfers.

According to one aspect of the present invention, there is provided a system for coordinating a voice component and a data component of a call to permit transferring a call from a first call center across a communication path, such as a public switching network or set of tie lines in a private network, to a second call center. The present invention uses a first call center that employs call processing control circuitry and control instructions that direct an automatic call distributor (ACD) or private branch exchange (PBX) to transfer to the second call center the voice component of the service call together with a unique identifier. The system selects from a pool of identifiers and uses the unique identifier according to principles such as those of the Dialed Number Identification Service (DNIS) protocol. The method and system also direct a transfer screen that has associated with it the same unique identifier and that accompanies the call that is being transferred from the first call center to the second call center. At the second call center, the voice component and transfer screen are related with one another using call processing control circuitry and associated control instructions. The voice component and transfer screen then appear simultaneously at an agent's workstation in the second call center.

According to another aspect of the present invention, there is provided a method for coordinating a voice component and a data component of a call that arrives at a first workstation of a first call center. The method permits transferring the call across a communication path to a second workstation at a second call center. At the first workstation, the service call has a voice component and a data component. The data component is used to produce a transfer screen of data relating to the call that the second call center is to receive. In the method, the first workstation invokes a transfer instruction to a first contact control server to transfer the call from the first call center to the second call center. The first contact control server then dynamically generates a unique identifier and associates the identifier with both the voice component and the transfer screen.

The next step of the method of the present invention is for the first contact control server to send the transfer screen to a second contact control server in the second call center and to direct the automatic call distributor or branch exchange of the first call center to transfer to the second call center the voice component of the call using the unique identifier. The unique identifier conforms to standard protocol principles such as those of DNIS or ISDN D-channel, for example. The second call center then sends the voice component to a second workstation of the second call center and a "voice is being connected message" to indicate the unique identifier associated with the call and the second workstation location to the second contact control server. Subsequently, the second contact control server, directs the transfer screen associated with the unique identifier to the second workstation. This step assures that the proper workstation at the second call center receives both the voice component and the transfer screen. Associating the unique identifier with the voice component and the transfer screen, therefore, makes it possible to identify and relate these call components at the second call center.

A technical advantage of the present invention is that it makes it possible to transfer a voice component of a customer call and data relating to the call to the second call center with little additional circuitry at either the first or second call center. For a call center having a contract control server or similar circuitry, the present invention only requires the necessary circuitry to generate the transfer screen and to associate the unique identifier with the voice component and the transfer screen.

Another technical advantage of the present invention is that it significantly improves customer service when transferring calls from a first call center to a second call center by transferring important information about the call in the form of both a voice component and a transfer screen from the first call center to the second call center.

A further and significant technical advantage of the present invention is that it makes call transfers significantly more helpful to the customer. The agent who receives the transferred call simultaneously receives a transfer screen of data pertaining to the call. The agent, therefore, knows the caller's name, pertinent account information, and why the call was transferred to the second call center. The result is that the customer does not mind, but truly appreciates, the transfer to the knowledgeable agent who has the necessary skills and data to properly service his call. This contrasts dramatically with prior art call transfer methods and systems.

In the following discussion, acronyms are used to explain the concepts of the present invention. To promote a more complete understanding of these concepts, the following are some of the acronyms more commonly used herein: (1) ACD for "automatic call distributor," (2) ANI for "automatic number identification," (3) CC for "call center," (4) $C^3$ for contact control client, (5) CCS for "contact control server," (6) CSR for "customer service representative," (7) CTI for "computer-telephone interface," (8) DNIS for "dialed number identification service," (9) ISDN for "integrated services digital network," (10) LAN for "local area network," (11) MIS for "management information systems," (12) PBX for "private branch exchange," (13) PRI for "primary rate interface," and (14) VRU for "voice response unit" or IVRU for "interactive voice response unit".

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The preferred embodiment of the present invention is best understood by referring to the FIGUREs wherein like numerals are used for like and corresponding parts of the various drawings.

Figure 1:
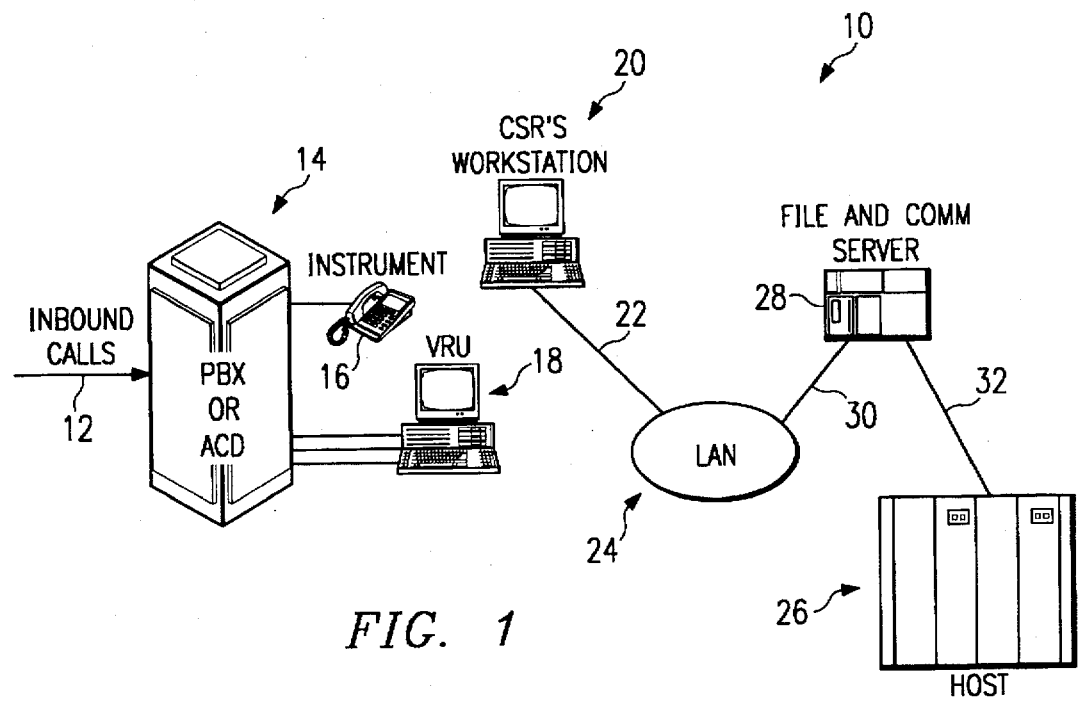
FIG. 1 provides a conceptual illustration of a call center for establishing an environment that may employ the inventive concepts of the preferred embodiment.

FIG. 1 provides a conceptual illustration of CC 10 that a supplier, vendor, or service company, as examples, may use in responding to calls and that may be modified to employ the inventive concepts of the present invention. As indicated by arrow 12, incoming calls with or without ISDN/PRI/ANI information are directed to ACD or PBX 14 that serves as a call distribution circuit and connects to telephone 16 and optional VRU 18. With telephone 16 and CSR workstation 20, a CSR provides services to a customer making a service call. CSR workstation 20 has a data link 22 to LAN 24. From LAN 24, data communications with host computer 26 are possible through file and communications server(s) 28. That is, file and communications server(s) 28 communicates to LAN 24 through link 30 and to host data processor 26 through link 32. File and communications server 28 may be one of a wide variety of components such as an IBM RS/6000 unit or other functionally similar front end processor.

In CC 10, ACD or PBX 14 acts as a front end to the existing telephone network providing additional call processing capabilities and features. These include intelligent queuing for calls, recorded delay voice announcements and interactive voice response via touchtone key pad or speaker independent voice recognition entry. Optionally VRU 18 answers calls that ACD 14 sends and collects information necessary to process the calls. VRU 18, upon acquiring the necessary information, routes the client service call to telephone 16 for service by an appropriate CSR. Otherwise, if ISDN/ANI is provisioned, ACD 14 may route the call directly to telephone 16. CSR workstation 20 includes the components that the CSR directly uses in dealing with the customer. This specifically involves one or more computer systems on their desk, as well as a voice line that may be separate from or integral to the computer system.

Figure 2:
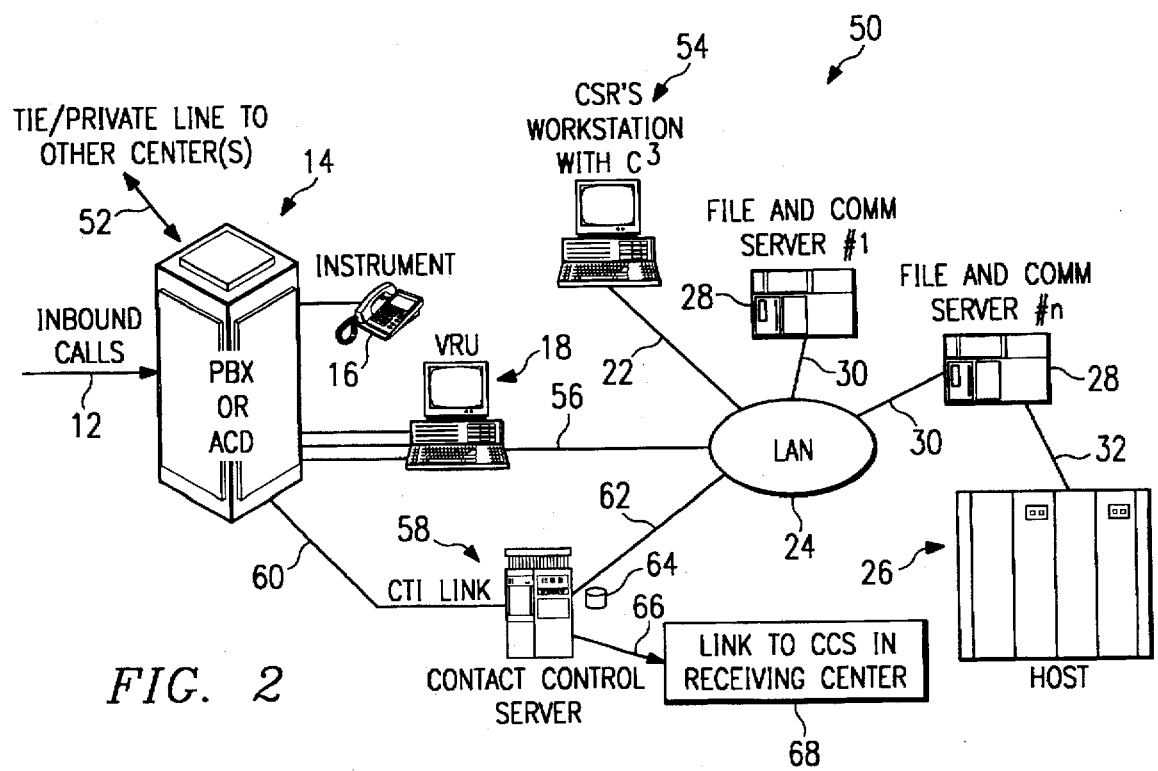
FIG. 2 provides a conceptual illustration of a call center including a contact control server to implement the preferred embodiment of the present invention.

FIG. 2 shows the CC architecture as modified for the purposes of the present invention. In particular, FIG. 2 shows CC 50 that applies the method and system of the preferred embodiment. As shown in FIG. 2, ACD or PBX 14 not only receives calls as indicated by arrow 12, but also connects to a remote call center as indicated by arrow 52. ACD 14 establishes communications to telephone 16 and, optionally, VRU 18. The CSR uses telephone 16 in conjunction with CSR workstation 54. CSR workstation 54 includes the necessary software and circuitry for a CSR to respond to a service call either by directly addressing the customer's needs at CSR workstation 54, by transferring the call to another CSR within CC 50, or by transferring the service call to a second CC. The software that CSR workstation 54 of the preferred embodiment uses to control the call is known as "contact control client" or $C^3$. This software includes a set of control instructions to invoke the transfer of the voice component and the data component of the call.

CSR workstation 54 connects via communication line 22 to LAN 24. VRU 18 of FIG. 2 connects via communication line 56 to LAN 24 or optionally to CCS 58 directly via communication line 57. CCS 58 communicates with ACD 14 through link 60. CCS 58 also connects to LAN 24 via communication line 62, stores data in database 64, and, communicates with an associated CCS at the second CC via line 66, as indicated by block 68. From LAN 24, communication may go to numerous file and communication servers each designated by reference numeral 28 that communicate via lines 30 and 32, respectively, to LAN 24 and one or more optional host data processor(s) 26.

CCS 58 and the $C^3$ computer software are a collection of programs that coordinate "screen pops," i.e., the simultaneous arrival and transfer of voice and data screen at CSR workstation 54. CCS 58 and $C^3$ software are designed, developed and sold through Teknekron Infoswitch Corporation of Fort Worth, Tex. and make the physical structure of CC 50 transparent by coordinating voice components and data components of the service call within CC 50, across multiple CCs, and with mobile agents who may communicate with CC 50. CCS 58 along with $C^3$ software provide these functions for host processor 26 and CCs that cannot perform these functions. CCS 58 also off-loads functions from host processor 26 to more rapidly and easily handle certain functions to support the CSR at CSR workstation 54. In its basic configuration, CCS 58 runs on a separate applications server connected to LAN 24. CCS 58 communicates via LAN 24 with the $C^3$ component of other CSR workstations 54. Optionally, CCS 58 may communicate via LAN communication line 62 with other devices such as VRU 18 and other MIS components such as hosts 26. CCS 58, therefore, permits (1) simultaneous voice/data coordination, (2) customer profile/history screen pops, (3) ANI database matching and enrichment, and (4) task queuing and work flow management.

Database 64 associates with CCS 58 to serve as an ANI, DNIS, or other call identification database. Additionally, database 64 may serve as a task queue manager for managing process flow for CC 50. In coordinating voice components and data components of a service call within a CC 50, CCS 58 receives customer identification information from ISDN/ANI 12 or VRU 18. With this information, CCS 58 requests a first screen customer profile from a customer database either within database 64 or at host processor 26. Then, upon receiving a "connect" message from link 60, CCS 58 will send the first screen to the receiving CSR workstation, such as CSR workstation 54. CCS 58 also coordinates intra-CC and inter-CC and call transfer requests, as herein described, via links 60, 62, and 66.

The CCS 58 work flow/data subsystem, therefore, permits the CSR to interact with the other data processing applications within the CC. In certain environments, CCS 58 may involve a corporate work flow system in which electronic documents representing customer records, contact information and even telephone calls can be routed to the most relevant place as they are needed. CCS 58, in this context, acts as the real-time link between the real-time ACD voice subsystem and the soft-real-time requirements of the remaining subsystems.

Figure 3:
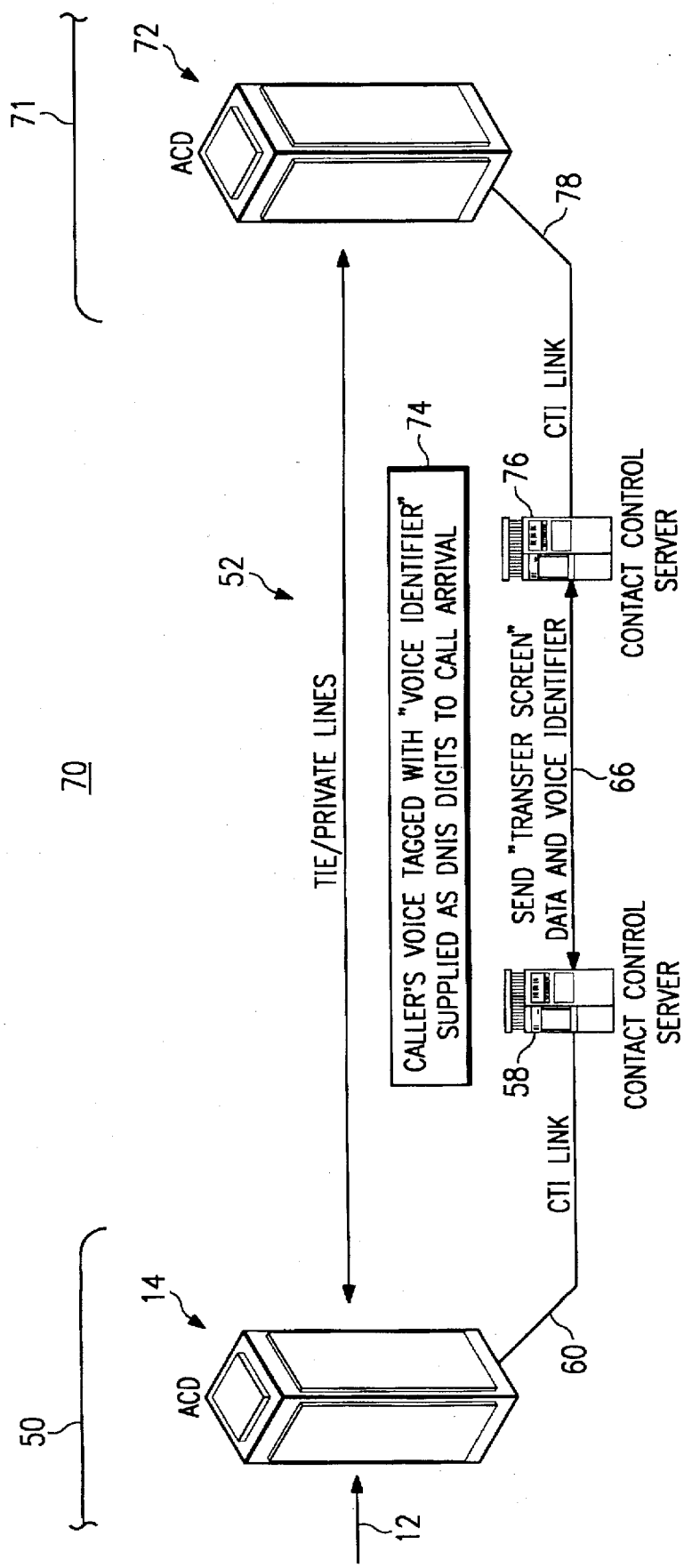
FIGS. 3 and 4 provide conceptual illustrations of automatic call distributors or private branch exchanges and contact control servers associated to illustrate various approaches to communicating a transfer call between two call centers according to the preferred embodiment.

Within CC 50, the preferred embodiment coordinates a voice component and a data component of a call to transfer the call across a communication path line 52 to a second CC (e.g., see CC 71 of FIGS. 3 and 4, below). The CC 50, therefore, includes the necessary network control circuitry to transfer to the second CC a voice component of the service cell together with a unique identifier using communication protocol principles such as those of DNIS or ISDN D-channel, for example. The major portion of this necessary circuitry that selects the unique value/number/digit resides in CCS 58. The method and system of the preferred embodiment also use CCS 58 and the $C^3$ software of CSR workstation 54 to direct a transfer screen relating to the service call from the CC 50 to the second CC. The transfer screen may include a wide variety of information concerning the call and the caller's identity and needs. The voice component and transfer screen are then sent to a single CSR workstation with the aid of the unique identifier at the second CC.

Before describing in further detail the operation of the preferred embodiment, it is helpful to understand the switching network connection between call centers. Therefore, FIGS. 3 and 4, further illustrate the connection relationships 70 and 80, respectively, between ACD 14 at CC 50 which is indicated by the partial bracket and ACD 72 at CC 71 which is also indicated by a partial bracket. Using tie or private lines 52, ACD 14 directs the voice component of the inbound call 12 to ACD 72. As this occurs, ACD 14 tags the voice component of the call with a voice identifier that is supplied as digits such as those of DNIS, ISDN D-channel or the like, with call arrival as indicated by block 74. CCS 58 then sends a transfer screen through connection 66 to CCS 76 at CC 71. Once at CC 71, the voice component and the transfer screen are simultaneously displayed at the second workstation for the CSR (not shown) at CC 71 to continue to service the call.

Figure 4:
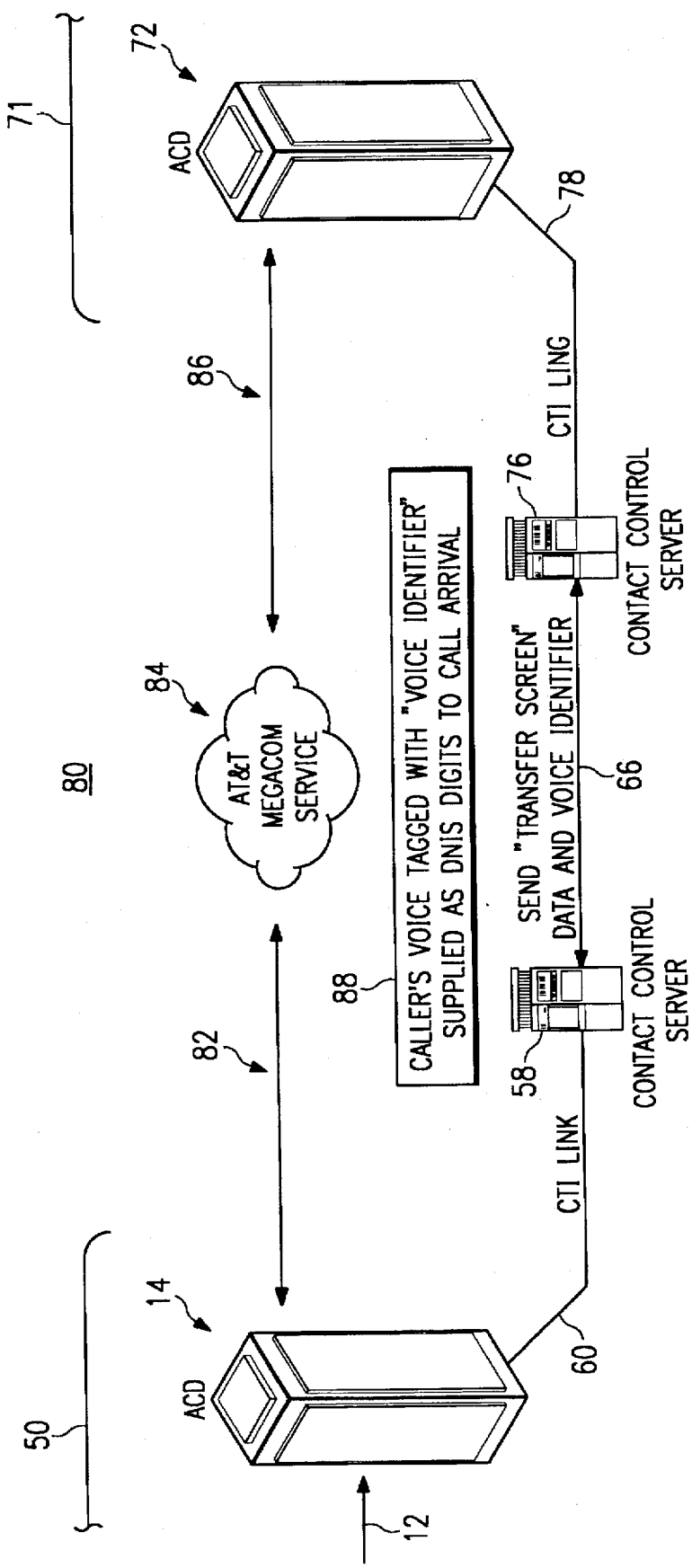

FIG. 4 illustrates an alternative connection relationship 80 of the preferred embodiment. In FIG. 4, ACD 14, again at CC 50, uses a communicate path that includes through line 82 to a public switching network 84 such as that having the name AT&T Megacom Service Network (or a 'similar MCI or SPRINT service). From public switching network 84, communication proceeds to ACD 72 at CC 71 via line 86. As indicated by block 88, ACD 14 tags the voice component of the call with a voice identifier using a protocol such as DNIS or ISDN D-channel digits. This voice component and the DNIS digits and/or ISDN D-channel data associated with the voice component are sent to ACD 72.

Having explained both the internal CC architecture and the CC-to-CC architecture, it is possible to explain in more detail the connections and data flow of the preferred embodiment. The CC 50 architecture establishes the foundation for the method and system of the preferred embodiment. Returning to FIG. 2, the architecture of CC 50 coordinates the voice component and data component of a call across CCs according to the following scenario. First, a CSR at CSR workstation 54, for example, indicates the need to transfer via $C^3$ from CC 50 to another CC, e.g., CC 71. The $C^3$ software includes a transfer initiating instruction for sending the request to CCS 58 to transfer the call. The call has at least two components: a voice component and a data component. The data component includes data that $C^3$ uses to generate a transfer screen of data containing relevant caller information. Then, the $C^3$ software informs CCS 58 of the need to transfer the service call to another CC. Depending on the appropriate software design either CCS 58 or $C^3$, or both, may then designate CC 71 to receive the call.

CCS 58 uses CTI link 60 to inform ACD 14 to initiate a transfer by dialing a digit stream. CCS 58 also sends a message to the receiving CCS 76 at CC 71 that references the appropriate unique identifier and includes the transfer screen information. At CC 71, ACD 72 receives the transferred voice component and unique identifier from ACD 14. In using tie line 52 of FIG. 3, the digit stream may be the line access code plus a one- to ten-digit number or the voice identifier of the form "DD . . . D." When using a public network 84 of FIG. 4, the number may be 1-800 followed by a seven-digit number of the form DDD-DDDD, where DDDD is the unique 4-digit voice identifier.

When ACD 72 selects an available CSR to route the call to, the CC 71 CTI link 78 sends the connect message indicating the unique identifier and CSR workstation location receiving the transferring call to CCS 76. Next, the CCS 76 sends to the receiving CSR the transfer screen associated with the voice component and $C^3$ pops or displays the transfer screen. This concludes the call transfer sequence, at which point the receiving CSR has at the CSR workstation both the voice component and the transfer screen. The receiving CSR will therefore know the caller's name, pertinent account information, any transfer information acquired prior to the need to transfer the call and why the call was transferred to the second call center.

Figure 5:
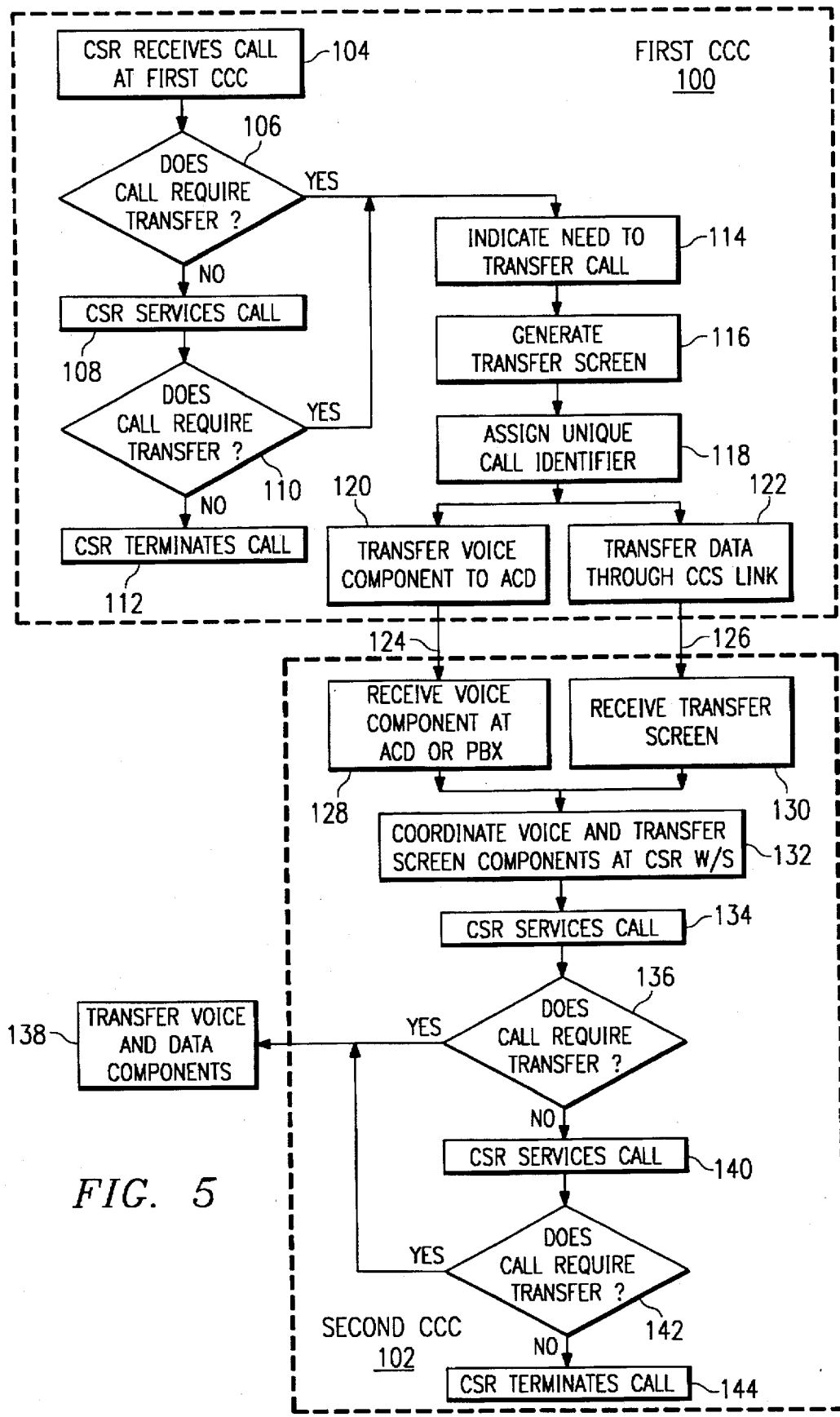
FIG. 5 provides a flow chart of service call transfer steps according the method and system of the preferred embodiment.

FIG. 5 illustrates an exemplary flow chart of the steps to execute the preferred embodiment of the present invention. The following description uses the exemplary CC 50, CC 71, and connection path 70 of FIG. 3 for exemplary purposes. According to FIG. 5, call transferring from CC 50 to CC 70, for example, is a two stage process. FIG. 5 shows the first stage that occurs at CC 50 using dash-line box 100 and the second stage at CC 71 using dash-line box 102. Beginning at the first stage, i.e., within box 100, the process is to first receive a call at CC 50 as indicated by block 104. A next step in the process is to determine whether the call needs to be transferred to another call center such as CC 71. If not, the CSR at CSR workstation 54 services the call as indicated by block 108. The CSR may, while servicing the call, determine that the call should be transferred. If so, the CSR via $C^3$ indicates to CCS 58 the need to transfer the call. If there is no need to transfer, the CSR terminates the call as indicated by block 112.

If either at the initiation of or during the call the CSR determines that the call should be transferred, the CSR will do so by indicating to CCS 58 via the $C^3$ software that the call should be transferred. Block 114 indicates this step. In response to the need to transfer, $C^3$ generates a transfer screen as indicated by block 116 and sends it to CCS 58. Then, CCS 58 assigns to both the voice component of the service call and the transfer screen a unique identifier using DNIS and/or ISDN D-channel protocol principles, as block 118 indicates. After assigning the unique identifier to both the voice component and the data component of the service call, further steps are to request transfer via CTI link 60 of the voice component of the call by ACD 14 as indicated by block 120 and to transfer the data transfer screen through CCS 58 as indicated by block 122.

From ACD 14, the voice component and transfer screen take separate and distinct paths to CC 71 as indicated by the data flow arrows 124 and 126 going into dash-line box 102. Within dash-line box 102, ACD 72 receives the voice component and routes it through to CSR's telephone, as indicated by block 128. Likewise, the data is presented to $C^3$ of the receiving CSR for the DNIS or ISDN D-channel digits corresponding to the voice identifier as indicated by CTI link 78 to CCS 76 as indicated by block 130. Using the unique identifier that associates with both the voice component and the transfer screen, the voice component and transfer screen reside at the receiving CSR's workstation as indicated by block 132. The receiving CSR may then service the call as indicated by block 134. The CSR will then determine whether the call requires further transfer as indicated by query block 136. If so, call transfer takes place as previously described and as indicated by block 138. Otherwise, the CSR services the call as indicated by block 140 and may further determine whether the call requires transfer as indicated by query block 142. If no further transfer of the call is necessary, the CSR terminates the call as indicated by block 144.

An important feature of the preferred embodiment is that a wide variety of components may carry out the above-described inventive concepts. That is, the transfer functions that CCS 58 provides are independent of the type of equipment used for ACD or PBX 14, telephone 16, VRU 18, CSR workstation 54, LAN 24, file and communications server 28, and host processor 26, as long as these components satisfy certain standards or specifications. For example, Rockwell, Northern Telecom, AT&T, Aspect, and Teknekron all manufacture an ACD, PBX/ACD or Central Office based ACD product that satisfactorily serves as ACD 14. Telephone 16 is specific to the type of ACD 14, but numerous vendors satisfy these specifications. Also, a wide variety of vendors, including InterVoice and Syntellect for example, provide the voice response unit functions of VRU 18. CSR workstation 54 may be compatible with the type of host processor 26, however, emulation software allows almost any work station to access almost any host consistent with the purposes of this embodiment. Vendors such as IBM, Digital Equipment Corporation, and Hewlett-Packard as well as virtually all personal computer manufacturers produce components that meet functional requirements for both of these components. Likewise, file and communication server 28 may be one of a variety of systems that are compatible with host processor 26. Furthermore, LAN 24 may be a Token Ring, Ethernet system, or other system such as those sold by a variety of vendors such as IBM, Novell, and Intel.

OPERATION

The operation as a whole of the preferred embodiment may be best understood by collectively returning to FIGS. 2 through 5, above. It is also beneficial to understand the operation of the preferred embodiment by way of example. Therefore, consider that CC 50 is a call center for a company that sells products from two catalogs. One catalog is for apparel from the company's apparel division and the other catalog is for its food division. Consider further that an in-bound call to CC 50 that serves the apparel division is a call by a customer who desires to purchase, for example, a winter coat from the apparel catalog and a selection of fine coffees from the gourmet food catalog. Within this scenario, the concepts of the preferred embodiment may follow the following script:

CSR1: (customer service representative number 1 in the apparel division): Thank you for calling T.I.C. Direct apparel sales. How may I help you?

C: (Customer): Hello, I am interest in buying some merchandise from your November apparel catalog.

CSR1: OK, your name please?

C: Ima Byer,

Several sets of events are possible at this point. For example, one set of events may be that the CC 50 uses an ANI matching function so that CSR workstation 54 immediately displays the customer's record screen when the call arrives through automatic number identification. At this point, the CSR only needs to confirm the identity of the caller. Another possibility is that the CSR keys a best guess phonetic spelling "IMA BUYER" to an "identify customer" application running on his workstation. The system pattern matches against known customers and produces Ima Byer's record.

CSR1: Is your address still 1234 Quality Court, Princetown, Any State?

C: Yes.

CSR1: OK, which of our catalogs are you ordering from?

C: The November catalog.

CSR1: Do you have a stock number for the item you desire?

C: Yes, the stock number is ABC1234X.

CSR1: This is a pea coat. Is that correct?

C: Yes.

CSR: That item comes in red and navy. Which color would you prefer?

C: I want the red pea coat. Thank you.

CSR: Certainly, that will be $89.95 plus shipping. Ms. Byer, would you like to purchase any other items from the T.I.C. Apparel Catalog today?

C: No, but I am interested in purchasing something from your T.I.C. Gourmet Foods Catalog.

CSR1: Thank you, that item may be purchased through our food products division. I will transfer you now, and they will complete your order.

C: Thank you very much.

At this point, the CSR indicates that the call needs to be transferred to the T.I.C. food products division call center. $C^3$ software generates and sends a transfer screen that includes the information relating to Ima Byer including the order in its present state to CCS 58. CCS 58 then attaches the unique identifier to the transfer screen and sends the transfer screen through CCS 58 along link 66 to CCS 76 at CC 71. At the same time, CCS 58 directs ACD 14 to send the voice component along tie line 52 to ACD 72 of CC 71.

Upon receipt of the voice component at ACD 72 by, in this example, the T.I.C. food products division, the call goes to a CSR within CC 71. ACD 72 informs the CCS 76 that it has received the voice component of Ima Byer's call and to which CSR workstation in CC 71 it should send the transfer screen. CCS 76 then sends the transfer screen including Ima Byer's in-process order to the proper workstation where the voice component of Ima Byer's call is being sent by ACD 72. This is done by matching at CCS 76 the unique identifier of the voice component as received at ACD 72 with the transfer screen that CCS 76 receives from CCS 58. This operation takes a matter of seconds or less and is fully transparent to the customer.

At CC 71, the following dialogue may take place:

CSR2: (second customer service representative): Hi, is this Ima Byer?

C: Yes.

CSR2: I see that you would like to purchase something from the T.I.C. Direct Sales food products division. Is that correct?

C: Yes, that's correct. I would like to purchase the set of the select imported coffees appearing on page 29 of your January catalog.

CSR2: Thank you very much. That will be $29.95 plus shipping. That brings your total for both the pea coat and the gourmet coffees to $119.90 plus shipping which will be $11.80 for a total of $131.70. Would you like to charge those purchases on your VISA card?

C: Yes.

CSR2: Will you be using your regular charge card no. 4800-1234-56789010?

C: Yes, that's correct.

CSR2: OK, we will ship those items today, and you should have them by Thursday. Is there anything else I can help you with today?

C: No, thank you.

CSR2: Thank you for calling, T.I.C. Direct Sales.

As the above exemplary operation describes, the preferred embodiment provides certain technical advantages, including the ability to easily transfer a service call from a first call control center to a second call control center including both a voice component and a transfer screen of data relating to the service call. Additionally, the preferred embodiment makes service call transfer significantly advantageous to the customer. By providing the ability for a customer service representative who receives the transferred call to simultaneously receive a transfer screen of data pertaining to the call, the customer does not mind, but truly appreciates, the transfer to a representative with the necessary skills and information to properly service the call.

In summary, there is provided a method for coordinating a voice component and a data component of a call that arrives at a first workstation of a first call center and transferring the call across a switching network to a second workstation at a second call center. The method includes the steps of initially receiving a call at a first workstation associated with a first call center. The call has a voice component and a data component. At the CSR workstation, $C^3$ software generates a transfer screen that the contact control server of the first call center sends to the contact control server of the second call center. At the direction of the CSR the first workstation uses the $C^3$ software and responds to a transfer instruction to transfer the service call from the first call center to a second call center. The first workstation then generates an information signal to the first contact control server in response to the transfer instruction. Then, the first contact control server dynamically generates a unique identifier and associates both the voice component and the transfer screen. The unique identifier conforms to standard dialed number identification service (DNIS) and/or ISDN D-channel protocol principles.

The first contact control server sends the transfer screen to a second contact control server in the second call center and via a CTI link associated with the first call center directs an ACD to transfer to the second call center the voice component and unique identifier. The second call center then receives the transfer call and associated identification digits and directs the voice component to a second workstation of the second call center. Also, the second call center informs the second CCS that a call received with identification digits reflecting its unique identifier is being sent to a second workstation. The second CCS then sends the transfer screen to the second workstation.

The second contact control server also presents the transfer screen simultaneously with the voice component using the unique identifier. This simultaneous presentation step assures that the proper workstation at the second customer contract center receives both the voice component and the transfer screen. All of this is possible by associating the unique identifier with the voice component and the transfer screen so that they can be identified properly at the second call center.

Although the invention has been described with reference to the above-specified embodiments, this description is not meant to be construed in a limiting sense. Various modifications of the disclosed embodiment, as well as alternative embodiments of the invention will become apparent to persons skilled in the art upon reference to the above description. It is, therefore, contemplated that the appended claims will cover such modifications that fall within the true scope of the invention.

What is claimed is:

1. A system for transferring a voice component and a related data component of a call from a first workstation and associated voice instrument to a second workstation and associated voice instrument, comprising:

a first call distribution circuit operable to receive a call comprising a voice component, the first call distribution circuit further operable to distribute the voice component to the first voice instrument;

a first contact control server coupled to the first call distribution circuit and operable to generate a data component related to the voice component;

a first workstation coupled to the first contact control server and operable to receive the data component, the first workstation comprising a first set of control instructions operable to generate a transfer screen from the data component;

a second call distribution circuit operable to receive the voice component via a first communication path from the first call distribution circuit, the second call distribution circuit further operable to distribute the voice component to the second voice instrument;

a second contact control server operable to receive the transfer screen from the first contact control server via a second communication path;

a second workstation coupled to the second contact control server and operable to receive the transfer screen;

transfer initiating instructions within the first set of control instructions operable to initiate a transfer instruction to transfer the transfer screen from the first workstation to the second workstation and to transfer the voice component from the first voice instrument to the second voice instrument;

transfer instructions within the first contact control server operable to respond to the transfer initiating instructions, the transfer instructions comprising:

voice component directing instructions operable to transfer the voice component from the first voice instrument to the second voice instrument using the first call distribution circuit, the first communication path, and the second call distribution circuit;

identifier generating instructions for generating an identifier operable to relate the voice component with the transfer screen and further operable to direct the identifier along with the voice component via the first communication path to the second call distribution circuit; and transfer screen directing instructions operable to direct the transfer screen, the identifier, and a voice connect message via the second communication path to the second contact control server; and receiving instructions within the second contact control server operable to receive the transfer screen and the identifier from the first contact control server, to relate the voice connect message and the transfer screen using the identifier, and to transfer the related transfer screen to the second workstation.

2. The system of claim 1, further comprising a second set of control instructions within the second workstation operable to receive and control the transfer screen.

3. The system of claim 1, wherein the first call distribution circuit further comprises instructions operable to automatically identify a call identifier upon initially receiving the call.

4. The system of claim 1, wherein the first communication path comprises one of a public switching network, a private network, and a tie line between the first call distribution circuit and the second call distribution circuit.

5. The system of claim 1, wherein the first contact control server comprises instructions operable to generate and convey the identifier using direct number identification service (DNIS) protocol principles.

6. The system of claim 1, wherein the first contact control server comprises instructions operable to generate and direct the identifier using integrated services digital network (ISDN) protocol principles.

7. The system of claim 1, further comprising a file and communication server operable to communicate the data component between the first workstation and a host processor.

8. A method for transferring a voice component and a related data component of a call from a first workstation and associated voice instrument to a second workstation and associated voice instrument, the method comprising the steps of:

receiving a call comprising a voice component using a first call distribution circuit;

distributing the voice component to the first voice instrument;

generating a data component related to the voice component using a first contact control server;

receiving the data component at a first workstation associated with the first contact control server;

generating a transfer screen using the data component and a first set of control instructions within the first workstation;

initiating a transfer instruction to transfer the voice component and the transfer screen from the first workstation and voice instrument to the second workstation and voice instrument using a set of transfer initiating instructions within the first set of control instructions;

responding to the transfer initiating instructions using a set of transfer instructions within the first contact control server, comprising:

transferring the voice component from the first voice instrument to a second call distribution circuit using the first call distribution circuit and a first communication path;

generating an identifier relating the voice component and the transfer screen;

directing the identifier to a second call distribution circuit using the first communication path; and directing the transfer screen, the identifier, and a voice connect message to a second contact control server associated with the second call distribution circuit using a second communication path;

distributing the voice component to the second voice instrument using the second call distribution circuit;

receiving the transfer screen and the identifier from the first contact control server;

relating the voice connect message and the transfer screen using the identifier; and transferring the related transfer screen to the second workstation.

9. The method of claim 8, further comprising the step of receiving and controlling the transfer screen using a second set of control instructions within the second workstation.

10. The method of claim 8, further comprising the step of automatically identifying the origin of the call after receiving the call.

11. The method of claim 8, wherein the first communication path comprises one of a public switching network, a private network, and a tie line between the first call distribution circuit and the second call distribution circuit.

12. The method of claim 8, wherein the step of generating an identifier further comprises the step of generating and directing the identifier using direct number identification service (DNIS) protocol principles.

13. The method of claim 8, wherein the step of generating an identifier further comprises the step of generating and directing the identifier using integrated services digital network (ISDN) protocol principles.

14. The method of claim 8, further comprising the step of communicating the data component between the first workstation and a host processor using a file and communication server.

15. The method of claim 8, further comprising the step of communicating the data component between the first workstation and a host processor using a file and communication server.

16. A method for transferring a voice component and a data component of a call that arrives at a first workstation and associated voice instrument to a second workstation and associated voice instrument, the method comprising the steps of:

receiving a call at a first workstation and associated voice instrument, the call comprising a voice component and a data component;

generating an identifier and a transfer screen at a first contact control server, the identifier associating the voice component with the transfer screen, the transfer screen generated using the data component;

communicating the transfer screen and the identifier from the first contact control server to a second contact control server using a data communication path that couples the first contact control server to the second contact control server;

communicating the voice component and the identifier from a first call distribution circuit coupled to the first workstation and associated voice instrument to a second call distribution circuit using a call communication path that couples the first call distribution circuit to the second call distribution circuit;

communicating the voice component associated with the identifier from the second call distribution circuit to a voice instrument associated with a second workstation; and communicating the transfer screen associated with the identifier from the second contact control server to the second workstation.

17. The method of claim 16, further comprising the step of controlling the voice component and the transfer screen using a second set of control instructions within the second workstation.

18. The method of claim 16, wherein the step of generating an identifier further comprises conveying the identifier using integrated services digital network (ISDN) protocol principles.

19. The method of claim 16, wherein the step of generating an identifier further comprises conveying the identifier using dialed number identification service (DNIS) protocol principles.

20. The method of claim 19, further comprising the step of communicating the data component between the first workstation and a host processor using a file and communication server.

* * * * *